(12) United States Patent
Nam et al.

(10) Patent No.: US 11,627,644 B2
(45) Date of Patent: Apr. 11, 2023

(54) WIRELESS INDUCTION HEATING COOKER WITH IMPROVED HEAT CONDUCTION EFFICIENCY

(71) Applicant: LG Electronics Inc., Seoul (KR)

(72) Inventors: Hyeunsik Nam, Seoul (KR); Wan Soo Kim, Seoul (KR); Woo Jin Choi, Seoul (KR); Byungkyu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 16/785,407

(22) Filed: Feb. 7, 2020

(65) Prior Publication Data

US 2020/0267807 A1  Aug. 20, 2020

(30) Foreign Application Priority Data

Feb. 20, 2019  (KR) .......................... 10-2019-0020141

(51) Int. Cl.
   *H05B 6/12* (2006.01)
   *H05B 1/02* (2006.01)
(52) U.S. Cl.
   CPC ......... *H05B 6/1254* (2013.01); *H05B 1/0266* (2013.01); *H05B 2206/02* (2013.01)
(58) Field of Classification Search
   CPC .............. H05B 6/1254; H05B 1/0266; H05B 2206/02; H05B 6/1245; A47J 27/08; A47J 27/0802; A47J 27/082; A47J 27/088; A47J 36/10; Y10S 99/14
   USPC ................................ 219/620, 621, 622, 624
   See application file for complete search history.

(56) References Cited

U.S. PATENT DOCUMENTS

2015/0313406 A1* 11/2015  Park ..................... A47J 36/04
                                                               219/730
2016/0174771 A1*  6/2016  Benoit .................... A47J 44/02
                                                               99/348

FOREIGN PATENT DOCUMENTS

| JP | 10-146273 A | * | 6/1998 |
| JP | 2009-240447 A | * | 10/2009 |
| JP | 2013-192838 A | * | 9/2013 |
| JP | 2013192838 | | 9/2013 |
| JP | 5943770 | | 7/2016 |
| WO | WO2009034501 | | 3/2009 |

OTHER PUBLICATIONS

Extended European Search Report in European Appln. No. 20153135. 7, dated Jun. 26, 2020, 8 pages.

* cited by examiner

*Primary Examiner* — Hung D Nguyen
(74) *Attorney, Agent, or Firm* — Fish & Richardson P.C.

(57) ABSTRACT

A wireless induction heating cooker includes a main body configured to receive and heat food objects therein, a lid configured to couple to an upper surface of the main body, and an inner pot configured to be accommodated in the main body and to be heated based on a magnetic field being generated by a heating coil of an induction heating device. The inner pot defines a heat conduction space that is surrounded by a bottom surface, an outer surface, and an inner surface of the inner pot.

20 Claims, 13 Drawing Sheets

RELATED ART

30'

RELATED ART

30'

RELATED ART

WIRELESS INDUCTION HEATING COOKER WITH IMPROVED HEAT CONDUCTION EFFICIENCY

CROSS-REFERENCE TO RELATED APPLICATION

The present disclosure claims priority to and the benefit of Korean Patent Application No. 10-2019-0020141, filed on Feb. 20, 2019, the disclosure of which is incorporated herein by reference in its entirety.

TECHNICAL FIELD

The present disclosure relates to a wireless induction heating cooker to improve heat conduction efficiency of an inner pot configured to be heated by an induction heating method.

BACKGROUND

A cooking device may use a wireless induction heating method for heating food based on a magnetic field generated by an induction heating device rather than heating food based on generated heat.

In some cases, an electric cooker, which heats food by an induction heating method, may include an inner pot as illustrated in FIGS. 2A and 2B.

FIG. 1 is a side cross-sectional view showing an induction heating cooker in related art. FIG. 2A is a perspective view showing an inner pot in related art. FIG. 2B is a side cross-sectional view showing the inner pot in FIG. 2A.

FIG. 1 shows an example of an electric cooker 100' in related art.

Referring to FIG. 1, in related art, the electric cooker 100' may include an inner pot 30' accommodated in an inner pot accommodator 14' and an induction heating coil 15' that is disposed below the inner pot accommodator 14' to heat the inner pot 30'. A heating power receiving coil 16' is provided on a bottom surface of the main body 12' of the rice cooker 10' to supply power to the induction heating coil 15', which was received from a power 20'.

In some cases, an induction current may be generated in a heating power receiving coil 16' based on a magnetic field generated by a heating power supply coil 23' provided in a power 20'. In some cases, an induction current may be generated by the induction heating coil 15' based on a magnetic field generated by the heating power receiving coil 16' and the inner pot 30' may be heated based on the induction current generated by the induction heating coil 15'.

The electric cooker 100' may perform a primary power transmitting process between the heating power supply coil 23' and the heating power receiving coil 16' and a secondary power transmitting process between the heating power receiving coil 16' and the induction heating coil 15' to heat the inner pot 30', which may result in power (or heat) loss during each of power transmitting processes.

In some examples, referring to FIGS. 2A and 2B, in order to facilitate taking out food after cooking is completed, a portion (hereinafter, referred to as "a rounding portion RA") adjacent to a lower edge of the inner pot may be rounded.

In some cases, where flat heating coils are provided below the inner pot to generate an induction current in the inner pot having such a structure, the heat conduction efficiency of the inner pot with respect to the rounding portion RA may be reduced as the rounding portion RA extends vertically away from the flat heating coils.

In some cases, reduction of the heat conduction efficiency of the inner pot due to the rounding portion RA may cause uneven temperature distribution in the inner pot with respect to a depth of the inner pot, which may degrade cooking quality of the electric cooker.

SUMMARY

The present disclosure describes a wireless induction heating cooker that may improve heat conduction efficiency of an inner pot configured to be heated by an induction heating method.

The present disclosure also describes a wireless induction heating cooker capable of receiving a magnetic field generated by a heating coil without leakage.

The present disclosure further describes a wireless induction heating cooker that may further improve heat conduction efficiency through a heat conduction member.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and the advantages of the present disclosure may be implemented by features described in claims and a combination thereof.

According to one aspect of the subject matter described in this application, a wireless induction heating cooker includes a main body configured to receive and heat food objects therein, a lid configured to couple to an upper surface of the main body, and an inner pot configured to be accommodated in the main body and to be heated based on a magnetic field being generated by a heating coil of an induction heating device. The inner pot defines a heat conduction space that is surrounded by a bottom surface, an outer surface, and an inner surface of the inner pot.

Implementations according to this aspect may include one or more of the following features. For example, the lid may be coupled to the main body by a hinge and configured to open and close the upper surface of the main body. The lid may be configured to be detached from the main body. In some examples, the inner pot may be configured to transfer heat generated on the bottom surface of the inner pot in a direction upward through the heat conduction space.

In some implementations, the inner pot may have a cylindrical shape and defines a pot opening at an upper surface thereof, and the bottom surface of the inner pot may have a flat shape and be configured to contact a bottom surface of the main body. In some implementations, an area of the bottom surface of the inner pot is less than an area defined by the heating coil of the induction heating device.

In some implementations, the inner pot may include a rounding portion that is disposed on the inner surface of the inner pot and that extends from an outer edge of the bottom surface of the inner pot. In some examples, the inner pot may extend along a vertical center line, and a horizontal distance between the vertical center line and the outer surface of the inner pot may be constant. In some examples, a horizontal distance between the outer surface of the inner pot and the inner surface of the inner pot may increase as a depth of the inner pot increases toward the bottom surface of the inner pot. In some implementations, the horizontal distance between the inner surface and the outer surface of the inner pot may be greater than a vertical thickness of the bottom surface of the inner pot.

In some implementations, the wireless induction heating cooker may further include a heat conduction member disposed in the heat conduction space, where a thermal conductivity of the heat conduction member may be greater than a thermal conductivity of the inner pot. In some examples, the inner pot may be made of cast iron or stainless steel, and the heat conduction member may be made of copper or aluminum. In some examples, the heat conduction member may extend along a depth direction of the inner pot.

In some implementations, the heat conduction member may extend vertically along the outer surface of the inner pot. In some implementations, the heat conduction member may have one end that is horizontally bent and extends into the heat conduction space.

In some implementations, the heat conduction member may include: a first portion that extends along the outer surface of the inner pot; and a second portion that is curved from a lower end of the first portion toward the inner surface of the inner pot and that extends into the heat conduction space. In some implementations, the heat conduction member may be disposed vertically above the bottom surface of the inner pot.

In some implementations, an outer surface of the heat conduction member may be flush with the outer surface of the inner pot. In some examples, the heat conduction member have a ring shape that extends along a circumferential direction of the inner pot. In some examples, the heat conduction member may surround a lower portion of the outer surface of the inner pot.

In some implementations, the wireless induction heating cooker may further include a metal plate disposed on the bottom surface of the inner pot and configured to be heated based on the magnetic field being generated by the heating coil.

In some implementations, the heat conduction efficiency of the inner pot may be improved through a heat conduction space surrounded by a bottom surface, an outer surface, and an inner surface of the inner pot.

In some implementations, an area of the bottom surface of the inner pot may be narrower than an area of a region formed by heating coils, thereby receiving the magnetic field generated by the heating coil without leakage.

In some implementations, the electric cooker may further include a heat conduction member that is provided in the heat conduction space and that has a high thermal conductivity than a material disposed in the heat conduction space, thereby further improving heat conduction efficiency of the inner pot.

In some implementations, a position of an inner space of the inner pot may not be directly heated through the induction heating method, but the position of the inner space of the inner pot may be heated by heat conduction, thereby improving uniformity in an internal temperature of the inner pot and improving cooking quality.

In some implementations, the magnetic field generated by the heating coil may be transmitted to a bottom surface of the inner pot without leakage so that induction heating devices may generate most or all output to increase a temperature of an inner pot, thereby improving heat transfer efficiency between devices.

In some implementations, the heat conduction efficiency of the inner pot may be further improved through the heat conduction member, and cooking quality and productivity of products may be improved through a simple configuration.

Further effects of the present disclosure, in addition to the above-mentioned effects, are described together while describing specific matters to implement the present disclosure.

DETAILED DESCRIPTION

Figure 1:
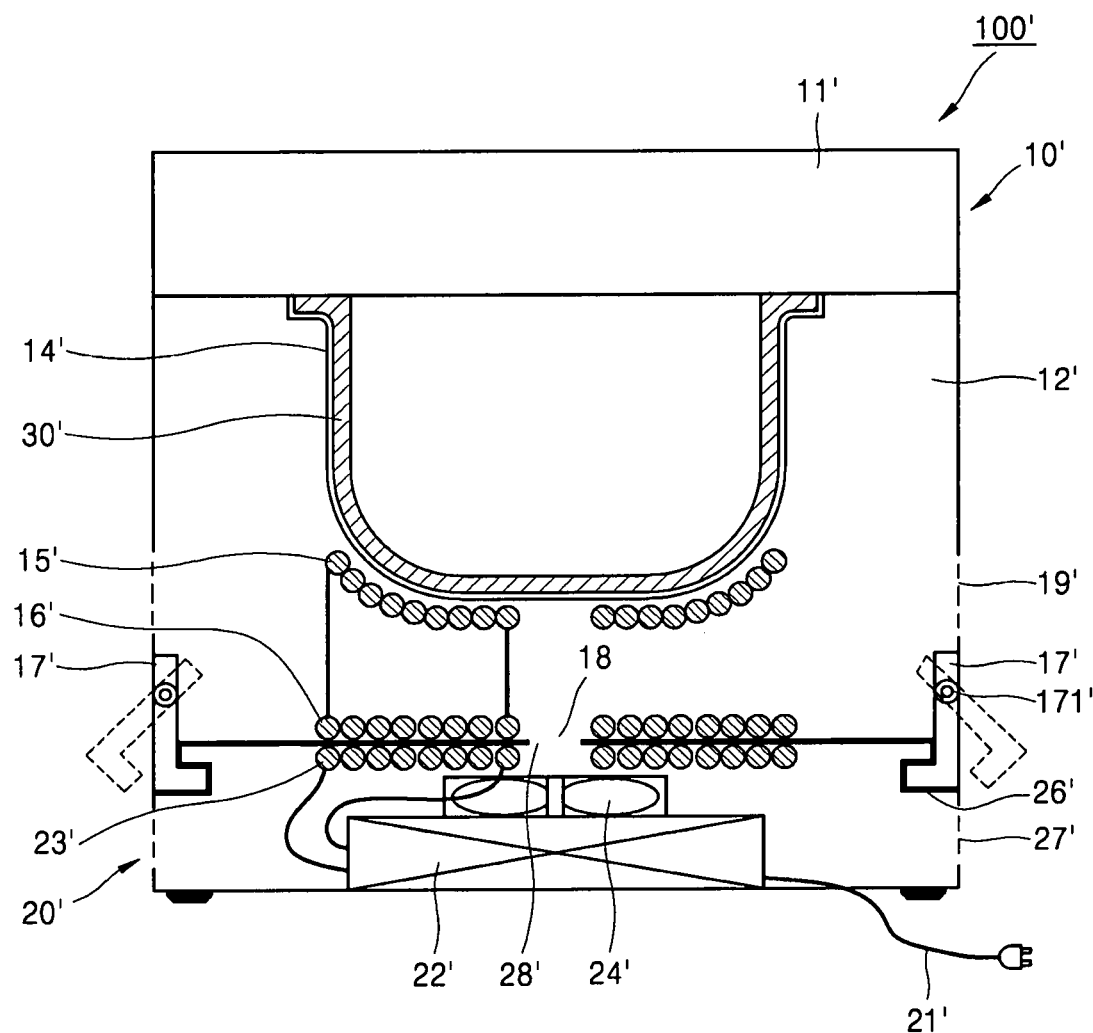
FIG. 1 is a side cross-sectional view showing an induction heating cooker in related art.

The above-mentioned objects, features, and advantages of the present disclosure are described in detail with reference to the accompanying drawings. Accordingly, the skilled person in the art to which the present disclosure pertains may easily implement the technical idea of the present disclosure. In the description of the present disclosure, if it is determined that a detailed description of a well-known relevant technology of the present disclosure may unnecessarily obscure the gist of the present disclosure, the detailed description thereof is omitted. One or more implementations of the present disclosure are described in detail with reference to the accompanying drawings. In the drawings, same reference numerals are used to refer to same or similar components.

The present disclosure relates to a wireless induction heating cooker that may improve heat conduction efficiency of an inner pot configured to be heated through an induction heating method.

One or more examples of a wireless induction heating cooker are described below in detail with reference to FIGS. 3 to 10.

Figure 3:
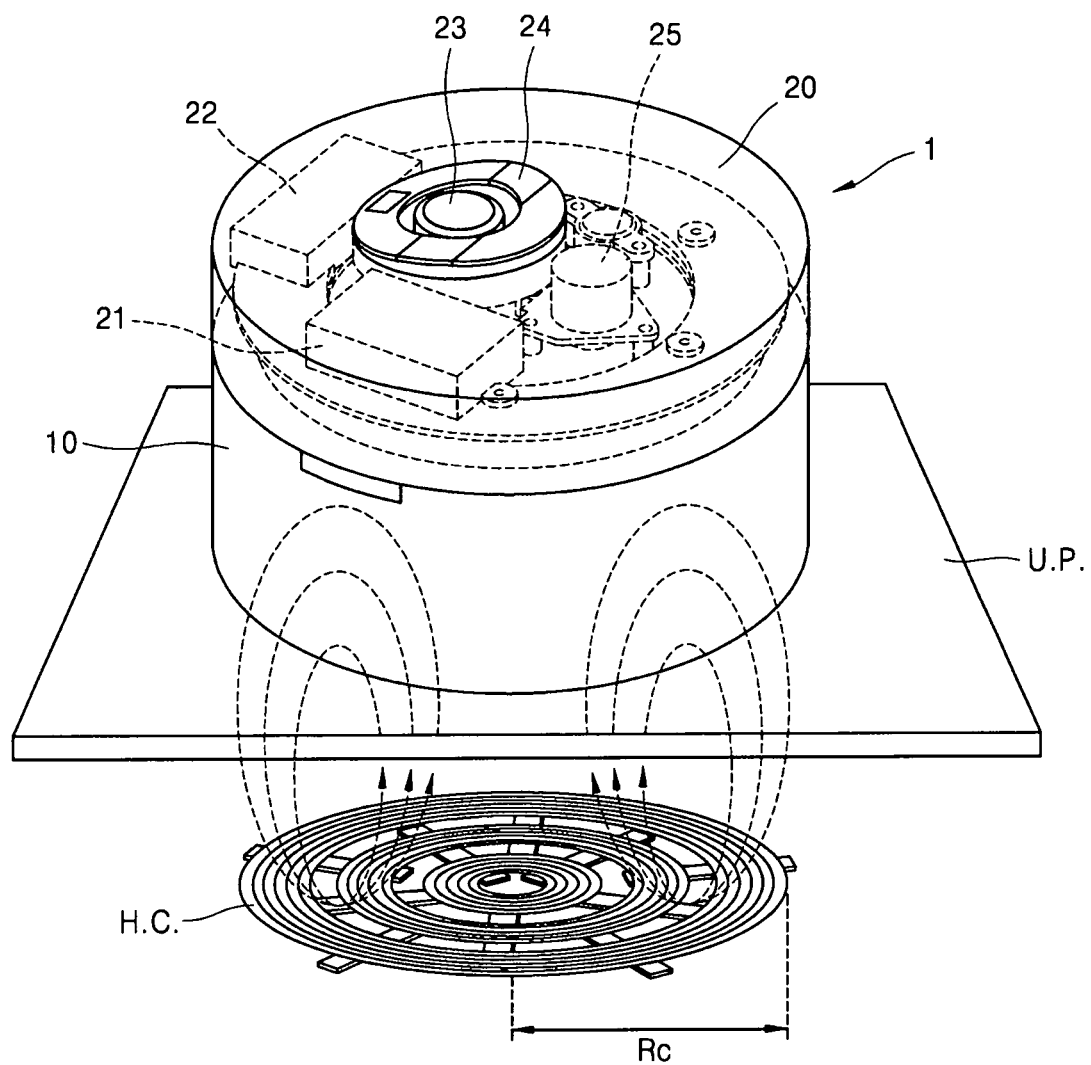
FIG. 3 shows an example of a wireless induction heating cooker configured to be operated on an induction heating device.

FIG. 3 shows an example wireless induction heating cooker that operates on an induction heating device.

Figure 4A:
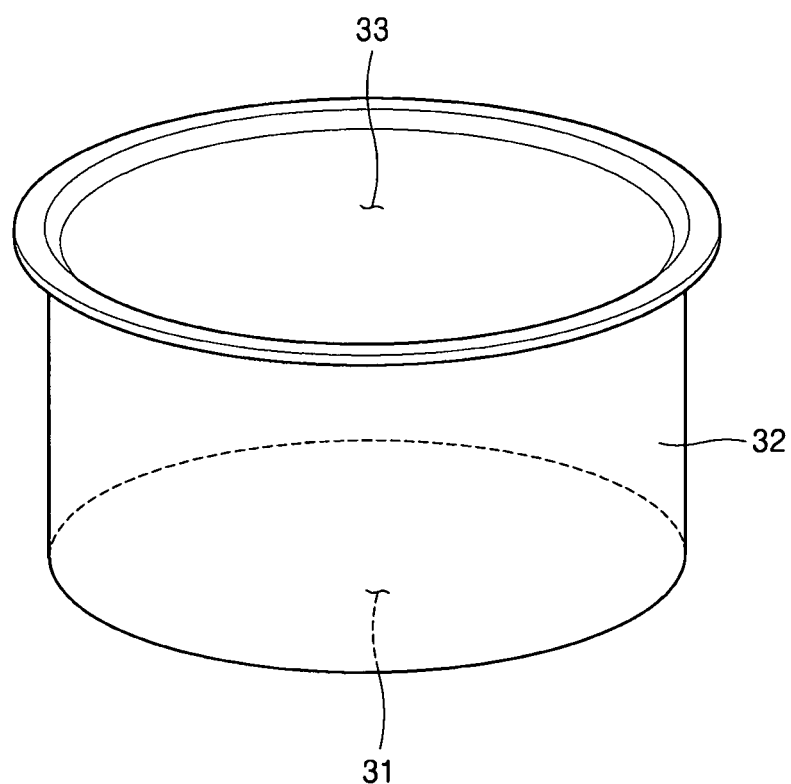
FIG. 4A is a perspective view showing an example of an inner pot.
Figure 4B:
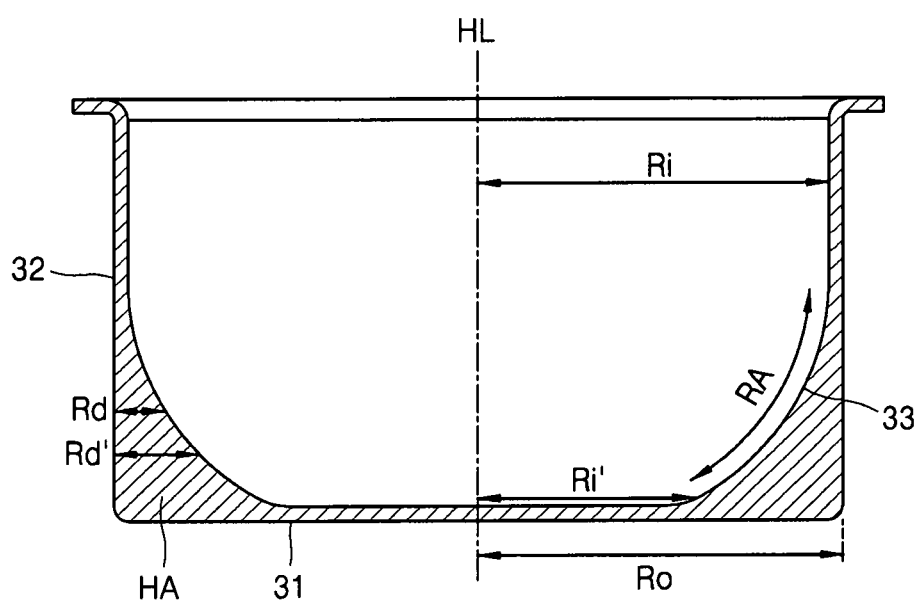
FIG. 4B is a side cross-sectional view showing the inner pot in FIG. 4A.

FIG. 4A is a perspective view showing an example inner pot. FIG. 4B is a side cross-sectional view showing the inner pot in FIG. 4A.

Figure 2A:
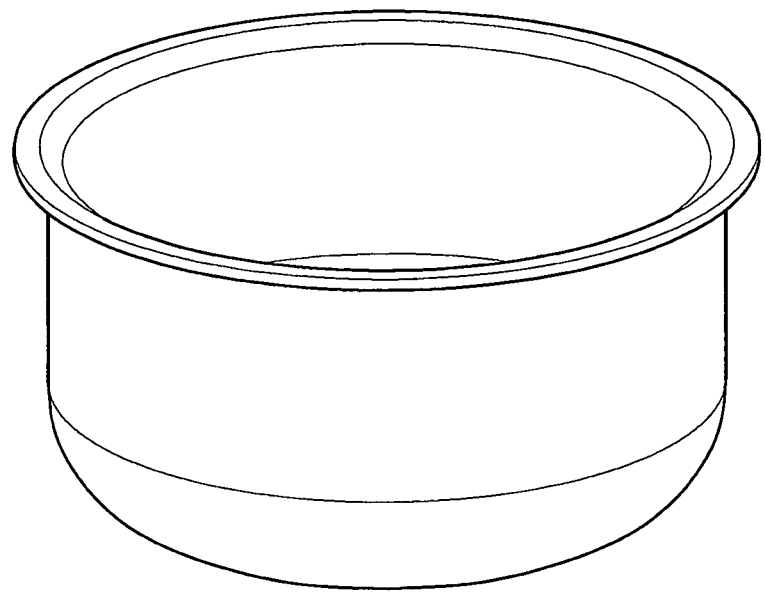
FIG. 2A is a perspective view showing an inner pot in related art.
Figure 5:
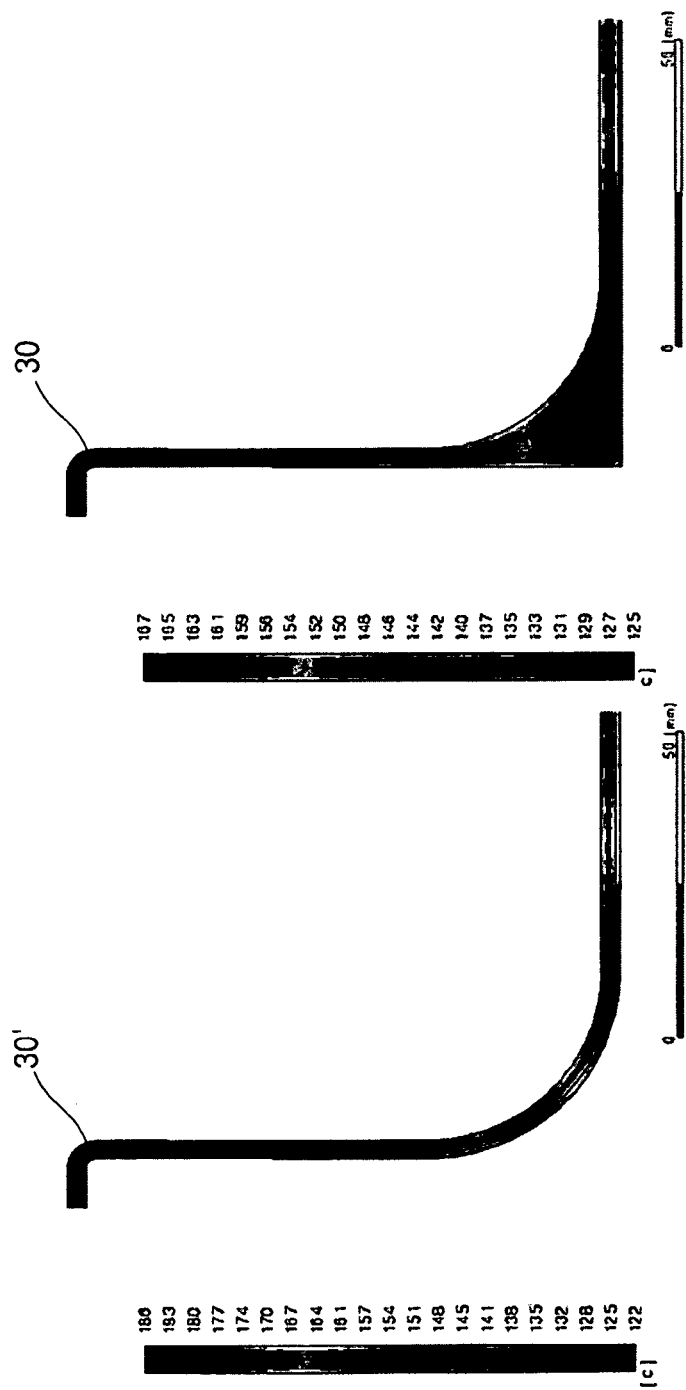
FIGS. 5 and 6 show examples of comparison between a heat conduction performance of the inner pot in related art in FIG. 2A and a heat conduction performance of the inner pot of the present disclosure in FIG. 4A.
Figure 6:
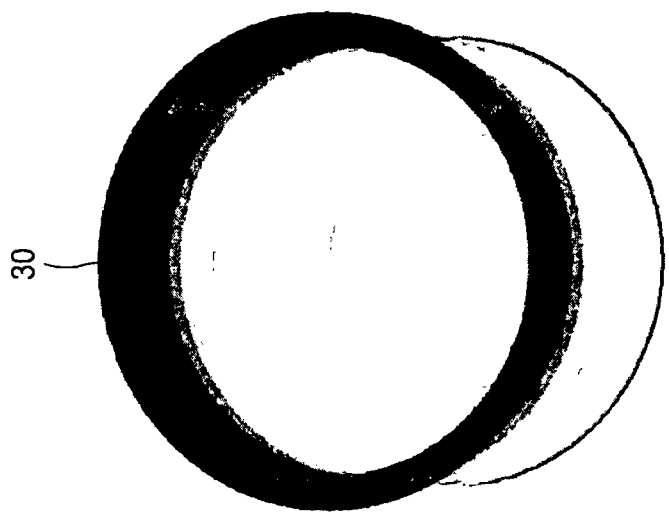
Figure 6:
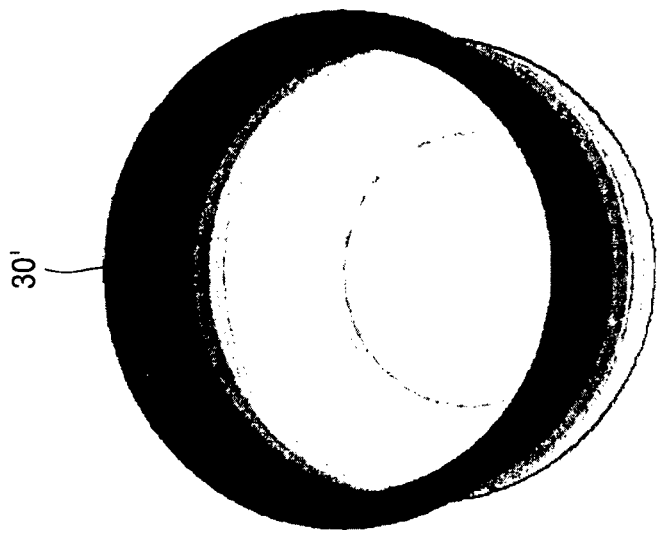
Figure 7:
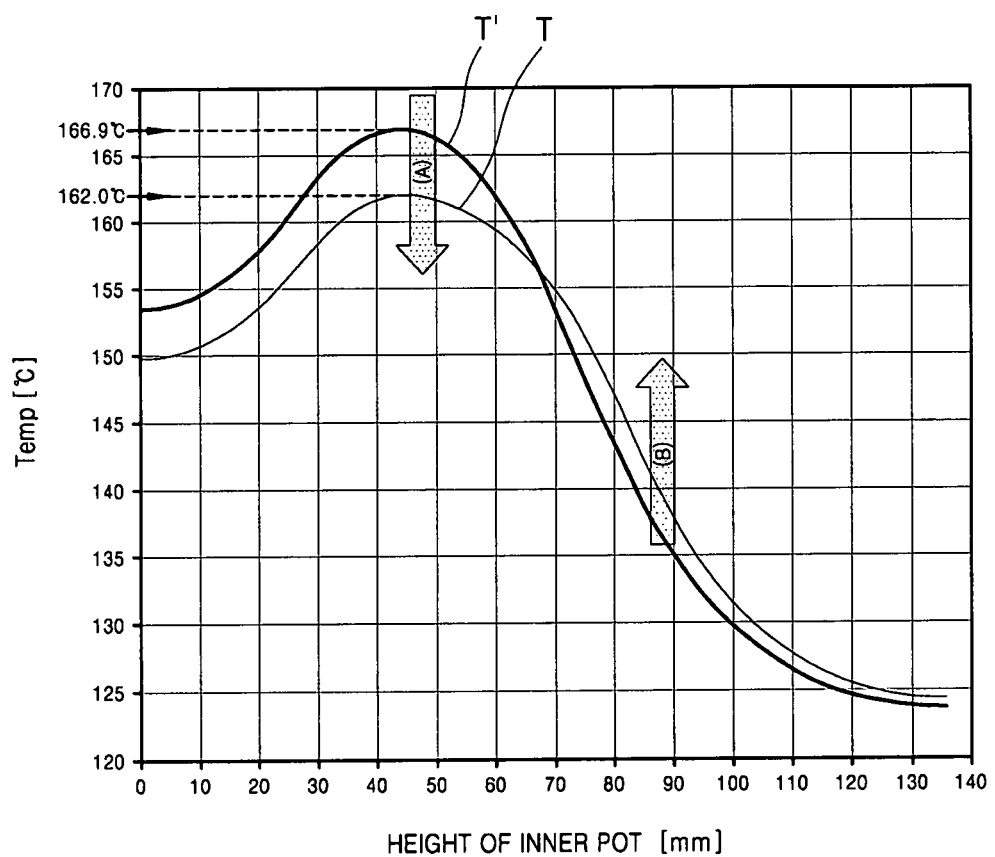
FIG. 7 is a graph showing an example of temperature changes with respect to heights of the inner pot in related art in FIG. 2A and the inner pot of the present disclosure in FIG. 4A.

FIGS. 5 and 6 show an example of comparison between heat conduction performance of the inner pot in related art in FIG. 2A and heat conduction performance of the inner pot of the present disclosure shown in FIG. 4A. FIG. 7 is a graph showing an example of a temperature change with respect to a height of the inner pot in related art in FIG. 2A and the inner pot of the present disclosure in FIG. 4A.

Figure 8A:
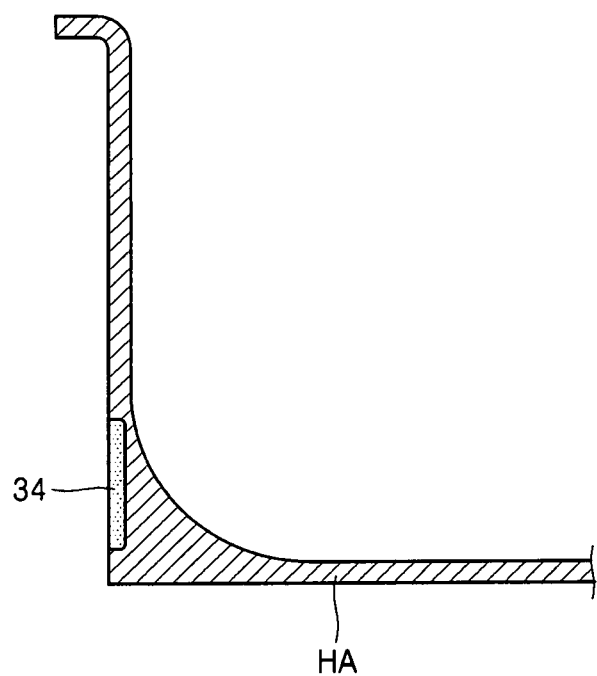
FIGS. 8A and 8B show examples of heat conduction members provided in heat conduction spaces.
Figure 8B:
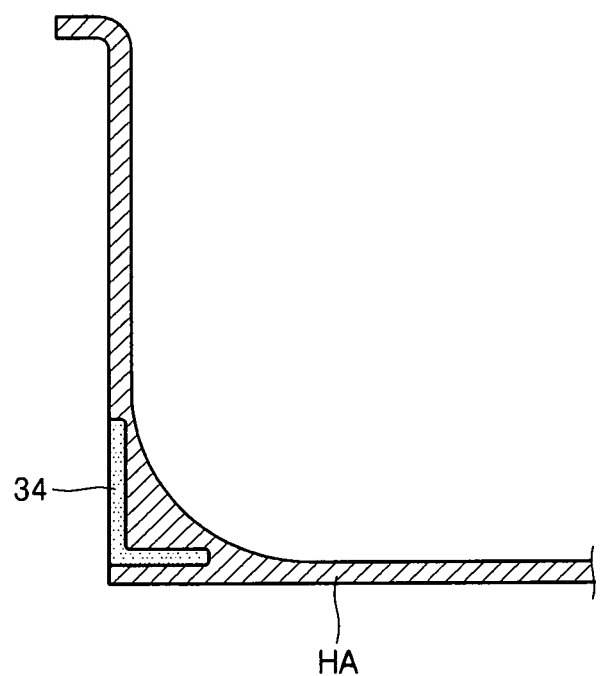

FIGS. 8A and 8B show examples of heat conduction members provided in heat conduction spaces.

Figure 9:
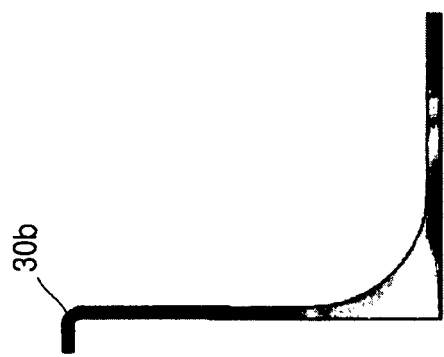
FIG. 9 shows an example of comparison between the heat conduction performances of the inner pot in FIG. 4A and the inner pot in FIGS. 8A and 8B.
Figure 9:
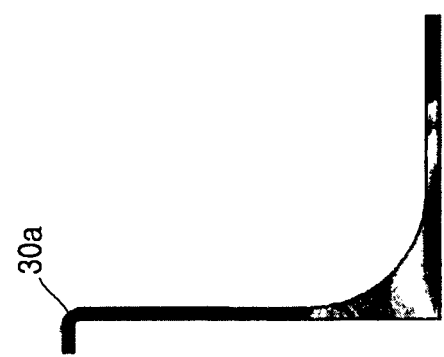
Figure 9:
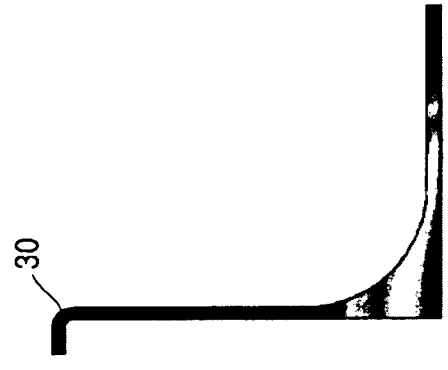

FIG. 9 shows an example of comparison between heat conduction performance of the inner pot in FIG. 4A and heat conduction performance of inner pots in FIGS. 8A and 8B.

Figure 10:
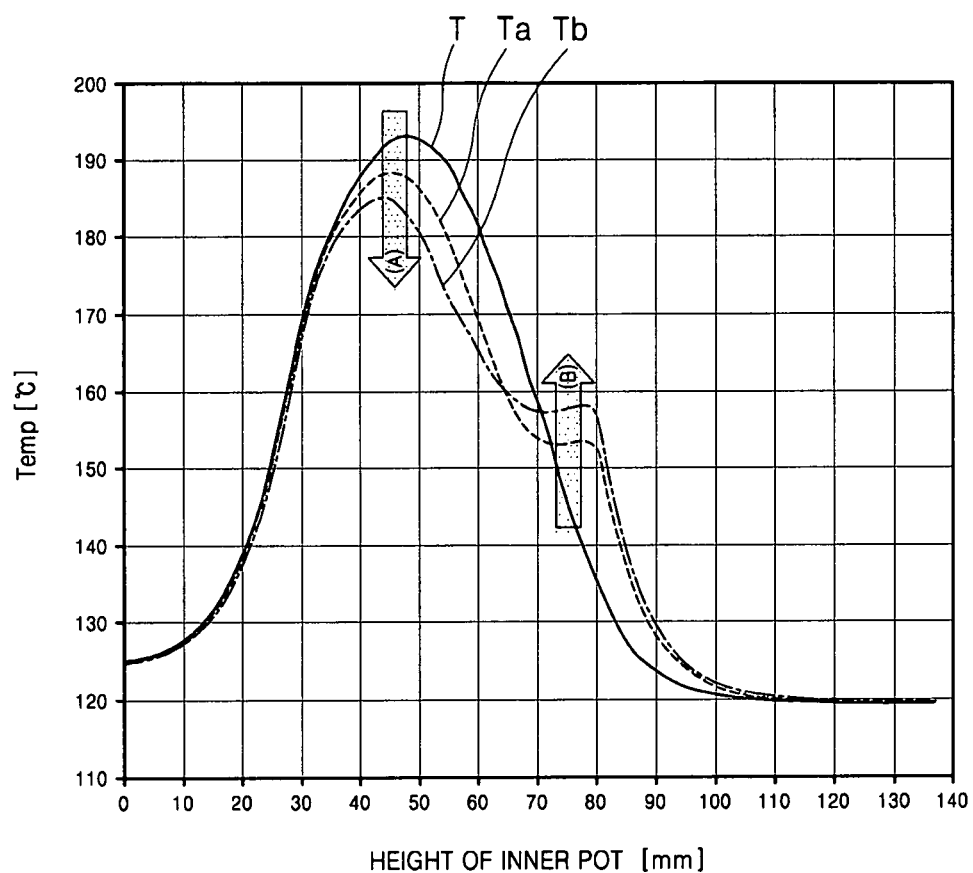
FIG. 10 is a graph showing an example of temperature changes with respect to heights of the inner pot in FIG. 4A and inner pots in FIGS. 8A and 8B.

FIG. 10 shows a graph corresponding to temperature changes of the inner pot in FIG. 4A and inner pots in FIGS. 8A and 8B with respect to heights of the inner pot in FIG. 4A and inner pots in FIGS. 8A and 8B.

Referring to FIG. 3, the wireless induction heating cooker 1 includes a main body 10, a lid 20 and an inner pot 30, and the lid 20 may include a controller 21, a communicator 22, a pressure weight 23, a noise reducer 24, and a steam exhauster 25. The wireless induction heating cooker 1 shown in FIG. 3 is according to one implementation, and components of the wireless induction heating cooker 1 are not limited to examples shown in FIG. 3, and some components can be added, changed or deleted as necessary.

In some implementations, the wireless induction heating cooker 1 may operate on any induction heating device that heats an object through an electromagnetic induction phenomenon.

As shown in FIG. 3, the wireless induction heating cooker 1 may be placed on an upper plate U.P. of any induction heating device including a heating coil H.C. and may be operated. In some examples, the wireless induction heating cooker 1 may be placed on the upper plate U.P. and may be placed on a vertical line of the heating coil H.C. and may be operated.

A current may flow through the heating coil H.C. under the control of the induction heating device, and thus the heating coil H.C. may generate a magnetic field. Current may be induced in the inner pot 30 based on the magnetic field generated by the heating coil H.C. to heat the inner pot 30 based on the induced current.

The main body 10 may be a case that supports a lower portion and a side portion of the wireless induction heating cooker 1. For example, the main body 10 may have a cylindrical shape with an opened upper portion of the main body 10, and cooking may be performed in the main body 10. In other words, the main body 10 may be configured to receive and heat food objects therein. In some examples, the inner pot 30 described below may be accommodated in the main body 10, and various types of grains such as rice may be cooked inside the inner pot 30. The main body 10 may define a body opening at an upper surface thereof, and the body opening may receive the inner pot 30 therethrough. The inner pot 30 may define a pot opening at an upper surface thereof, and the pot opening may receive food items therethrough.

The lid 20 is a case that seals an upper portion of the wireless induction heating cooker 1 and may be fastened to the upper surface of the main body 10. In this case, the lid 20 may be fastened to the upper surface of the main body 10 to be opened and closed with respect to the upper surface of the main body 10.

For example, the lid 20 may be coupled to the main body 10 using a hinge to be selectively opened and closed. In some examples, the lid 20 may be coupled to a hinge shaft provided at an edge of one surface of an upper portion of the main body 10 and selectively opened and closed with respect to the upper surface of the main body 10 by rotating about the hinge shaft.

In some implementations, the lid 20 may be removed from the main body 10. In some examples, the lid 20 may be coupled to the upper surface of the main body 10 using a plurality of fastening members at an upper edge of the main body 10. In this case, the lid 20 may be completely separated from the main body 10.

As shown in FIG. 3, the lid 20 may include a controller 21 that controls operation of the wireless induction heating cooker 1, and a communicator 22 that performs data communication with the above-described induction heating device. The controller 21 and the communicator 22 may be implemented with a printed circuit board (PCB) including a plurality of integrated circuits (ICs).

In some cases, the lid 20 may include a pressure weight 23 that maintains an internal pressure of the wireless induction heating cooker 1 at a constant pressure, and a noise reducer 24 including a plurality of sound absorbing members that reduce noise generated during exhaust of steam.

In some cases, the lid 20 may include a steam exhauster 25 (e.g., a solenoid valve) that exhausts the steam inside the wireless induction heating cooker 1 based on a specific control signal.

Elements provided in the lid 20 are not limited to the above-described components. For example, the lid 20 may further include a touch panel and a display. The touch panel may receive operation of users. The display may indicate an operation state of the wireless induction heating cooker 1.

The inner pot 30 may be accommodated in the main body 10 and may be heated based on a magnetic field generated by the heating coil H.C. of the induction heating device.

In some cases, where the wireless induction heating cooker 1 is placed above the induction heating device, a lower surface of the inner pot 30 may be spaced apart from the heating coil H.C. by a predetermined distance and a bottom surface 31 of the main body 10 may be disposed between the lower surface of the inner pot 30 and the heating coil H.C. Based on the current flowing through the heating coil H.C., the magnetic field generated by the heating coil H.C. may induce a current in the inner pot 130, and Joule's heat may be generated in the inner pot 130 based on the induced current.

In order to generate the induced current in the inner pot 30, the inner pot 130 may include any magnetic component. For example, the inner pot 130 may be made of a cast iron containing iron (Fe), and may be made of a clad in which iron (Fe), aluminum (Al), stainless steel, and the like, are bonded.

As shown in FIG. 4A, the inner pot 30 may include a bottom surface (an outer bottom surface 31) horizontally facing the heating coil H.C., an outer surface 32 that contacts an inner surface of the main body 10, and an inner surface 33 contacting the food.

In this structure, the inner pot 30 may include a heat conduction space HA surrounded by the bottom surface 31, the outer surface 32, and the inner surface 33 of the inner pot 30.

The heat conduction space HA may filled with a material having high thermal conductivity. In some examples, the heat conduction space HA may define a portion of the inner pot 30 and may be made of the same material as the inner pot 30, and an independent space of the inner pot 30, and may be made of different material from material of the inner pot 30. It is described below assuming that the heat conduction space HA is integrated with the inner pot 30 and is made of the same material as the inner pot 30.

Figure 2B:
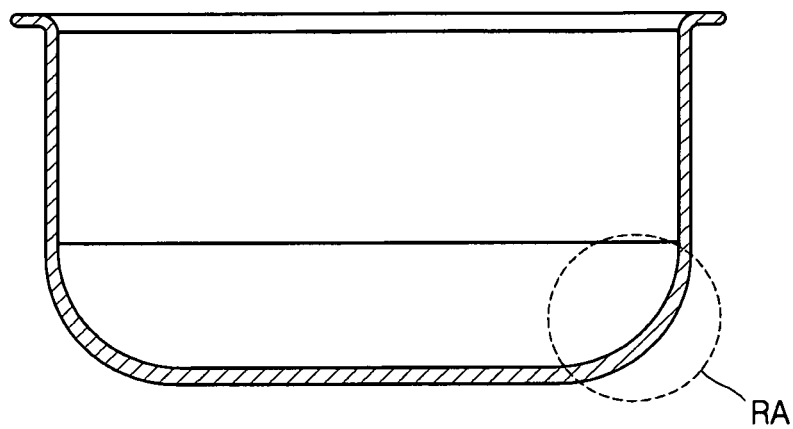
FIG. 2B is a side cross-sectional view showing the inner pot in FIG. 2A.

Referring to FIGS. 4A and 4B, the inner pot 30 may have a cylindrical shape with an open upper surface of the inner pot 30, and the bottom surface 31 of the inner pot 30 may have a flat shape in close contact with the bottom surface of the main body 10. In other words, in contrast to the inner pot 30' in related art described with reference to FIGS. 2A and 2B, the inner pot 30 of the present disclosure may have a flat bottom surface 31 so that an entire surface of the bottom surface 31 of the inner pot 30 may closely contact the bottom surface of the main body 10.

In this case, an area of the bottom surface 31 may be less than an area of the region formed by the heating coil H.C. The region formed by the heating coil H.C. may be a minimum area that may include all portions of the heating coil H.C.

Referring to FIG. 3, in one example, the heating coil H.C. may be a circular flat coil. In this case, the area of the region formed by the heating coil H.C. may be an area of a circle determined by a coil radius Rc, which is a distance from a center of the heating coil H.C. to an outer circumferential surface of the heating coil H.C.

In some examples, as shown in FIG. 4B, an area of the bottom surface 31 may correspond to an area of a circle determined by an outer diameter Ro of the inner pot 30, which is a distance between a center vertical line HL of the inner pot 30 and the outer surface 32.

In this case, the area of the circle determined by the outer diameter Ro of the inner pot 30 may be less than the area of the circle determined by the coil radius Rc. Accordingly, the magnetic field generated by the heating coil H.C. may be transmitted to the bottom surface 31 of the inner pot 30 in the area where the inner pot 30 is disposed without leakage.

In some implementations, the magnetic field generated by the heating coil H.C. may be transmitted to the bottom surface 31 of the inner pot 30 without leakage, so that the induction heating device may generate all output to increase the temperature of the inner pot 30, thereby improving the heat transfer efficiency between devices.

Through the above structure, heat may be generated in the bottom surface 31 of the inner pot 30 through the electromagnetic induction phenomenon, and the heat generated in the bottom surface 31 of the inner pot 30 may be transferred upward of the inner pot 30 through a heat conduction space HA.

In some examples, as shown in FIG. 4B, the heat conduction space HA may be defined at a side end of the inner pot 30 in a radial direction with respect to the center vertical line HL of the inner pot 30. The heat generated in the bottom surface 31 may be transferred upward along the side end of the inner pot 30 through the heat conduction space HA, so that the heat may also be transferred to other portions of the inner pot 30 which are not adjacent to the bottom surface 31.

In order to improve the heat conduction efficiency with respect to the heat conduction space HA, a rounding portion RA may be disposed on the inner surface 33 adjacent to the edge of the bottom surface 31.

As shown in FIG. 4B, the rounding portion RA may be adjacent to an edge to form a circumference of the bottom surface 31. In other words, an inner diameter Ri of the inner pot 30 corresponds to a distance between a center vertical line HL of the inner pot 30 and the inner surface 33 of the inner pot 30. The inner diameter Ri of the inner pot 30 has a predetermined inner diameter level to a preset depth and is gradually reduced at portions of the inner pot 30 having a preset depth or more and is gradually reduced with respect to the depth of the inner pot 30. The inner diameter Ri of the inner pot 30 may be a minimum inner diameter Ri' of the inner pot 30 on the inner bottom surface of the inner pot 30.

In some implementations, an outer diameter Ro of the inner pot 30, which is a horizontal distance between the center vertical line HL and the outer surface 32 of the inner pot 30, may have a constant outer diameter level regardless of the depth of the inner pot 30. In other words, the outer surface 32 of the inner pot 30 may be parallel to the central vertical line HL of the inner pot 30 regardless of the depth of the inner pot 30.

In some cases, where the rounding portion RA is disposed in the inner pot 30, and the outer diameter Ro of the inner pot 30 has a constant diameter level, the horizontal distance between the outer surface 32 and the inner surface 33, of the inner pot 30, may increase as the depth of the inner pot 30 increases.

Referring back to FIG. 4B, the horizontal distance Rd between the outer surface 32 and the inner surface 33 of the inner pot 30 may increase as the depth of the inner pot 30 is greater from a portion at which the rounding portion RA is disposed to an inner bottom surface of the inner pot 30. In some examples, a horizontal distance Rd may be greater than a horizontal distance Rd'. The horizontal distance Rd is a distance between the outer surface 32 and the inner surface 33 of the inner pot 30 determined at a portion of the inner pot 30 having a relatively less depth. The horizontal distance Rd' is a distance between the outer surface 32 and the inner surface 33 of the inner pot 30 determined at a portion of the inner pot 30 having a relatively greater depth of the inner pot 30. The horizontal distance Rd may be greater than a vertical thickness of the bottom surface 31, and define a maximum sidewall thickness at a position facing the bottom surface 31.

The heat conduction efficiency of the inner pot of the present disclosure may be greatly improved through the above-mentioned structure compared to the inner pot 30' in related art.

FIGS. 5 and 6 show example temperatures of inner pots 30' and 30 with respect to heights of inner pots 30' and 30 determined based on heating the inner pots 30' and 30 at lower portions of the inner pots 30' and 30 with a same power (e.g., 1000 W), where the inner pot 30' in related art in FIG. 2A may be made of a same material (e.g., clad), for comparison, as a material of the inner pot 30 of the present disclosure in FIG. 4A.

FIGS. 5 and 6 show that, in the case of the inner pot 30' in related art, the bottom surface 31 of the inner pot 30' is heated to 186° C., but the upper portion of the inner pot 30' is only heated to 122° C. The temperature differences between surfaces of the inner pot 30' is a maximum of 64° C., which is greater.

By contrast, in the case of the inner pot 30 of the present disclosure, the bottom surface 31 of the inner pot 30 is heated to 167° C., and the upper portion of the inner pot 30 is heated to 125° C., so that temperate differences between the two surfaces of the inner pot 30 is a maximum of 42° C. The temperature difference between the two surfaces of the inner pot 30 of the present disclosure are reduced by 22° C. compared to the inner pot 30' in related art. In other words, according to the present disclosure, the inner pot 30 of the present disclosure has improved temperature distribution uniformity than the inner pot 30' in related art.

FIG. 7 shows a graph corresponding to a temperature (T') of the inner pot 30' in related art in FIG. 2A and a temperature (T) of the inner pot 30 of the present disclosure in FIG. 4A with respect to heights of the inner pots 30' and 30.

Referring to FIG. 7, according to the present disclosure, a temperature of the inner pot 30 measured a portion of the inner pot having a relatively less height is reduced (in a direction of arrow A) compared to the inner pot 30' in related art and the temperature of the inner pot 30 measured at a portion of the inner pot having a relatively greater height may be increased (in a direction of arrow B) compared to the inner pot 30' in related art, thereby providing temperature distribution uniformity of the inner pot 30.

As described above, according to the present disclosure, the position of the inner space of the inner pot 30, which may not be directly heated through the induction heating method, may also be heated, thereby improving the uniformity in the inner temperature of the inner pot 30 and improving cooking quality.

In order to improve heat conduction efficiency with respect to the heat conduction space HA, the heat conduction member 34 having a higher thermal conductivity than the material of the heat conduction space HA may be provided in the heat conduction space HA.

The heat conduction member 34 may be made of a material different from the material of the heat conduction space HA. For example, when the heat conduction space HA is made of cast iron or stainless steel, the heat conduction member 34 may be made of copper (Cu) or aluminum (Al) having a relatively higher thermal conductivity than the thermal conductivity of the heat conduction space HA.

The heat conduction member 34 may be provided at any position inside the heat conduction space HA.

For example, the heat conduction member 34 may include a plurality of members having a predetermined arc length along a circumferential direction of the inner pot 30. In some examples, the heat conduction member 34 may include a plurality of members having a central angle of 30° with respect to the center vertical line HL of the inner pot 30. In this case, the heat conduction members 34 may be spaced apart by a predetermined center angle.

As another example, the heat conduction member 34 may be disposed in the heat conduction space HA and may have an integrated ring shape extending along the circumferential direction of the inner pot 30. As shown in FIG. 4B, the heat conduction space HA may be defined along the circumferential direction of the inner pot 30. In this case, the heat conduction member 34 may be disposed in the heat conduction space and may have a ring shape extending along the circumferential direction of the inner pot 30. In other words, the heat conduction member 34 may include a single ring-shaped member having a center angle of 360° with respect to the center vertical line HL of the inner pot 30.

The heat conduction member 34 may be disposed in the heat conduction space HA and may extend along a depth direction of the inner pot 30.

Referring to FIG. 8A, for example, the inner pot 30a may include a heat conduction member 34 that is disposed in the heat conduction space HA and extends along the depth direction of the inner pot 30a. In some examples, as shown in the side cross-sectional view of the inner pot 30a, the heat conduction member 34 may have an I-shape.

The length of the heat conduction member 34 extending in the depth direction of the inner pot 30a is not limited. For example, the heat conduction member 34 may have one or a first end adjacent to the bottom surface 31 may be spaced apart from the bottom surface 31 by a predetermined distance.

In some cases, where the heat conduction member 34 is made of a non-magnetic material having high thermal conductivity, the induced current generated based on the magnetic field may not be generated in the heat conduction member 34. Accordingly, based on the heat conduction member 34 having one end that contacts the bottom surface 31, the heat caused based on the induced current may not be generated in the heat conduction member 34 that contacts the bottom surface 31.

In this case, the area where heat is generated based on the induced current is obtained by subtracting an area of one end of the heat conduction member 34 from an area of an entire bottom surface 31. For example, the heat conduction member 34 may have one end spaced apart from the bottom surface 31 by a predetermined distance.

The heat conduction member 34 may have one end that is disposed in the heat conduction space HA and horizontally bent.

In some examples, an outer surface of the heat conduction member 34 may be flush with an outer surface of the inner pot 30a.

In some implementations, referring to FIG. 8B, the inner pot 30b may include a heat conduction member 34 and the heat conduction member 34 is disposed in the heat conduction space HA and extends along a depth direction of the inner pot 30b and has one end of the heat conduction member 34 horizontally curved. In this case, as shown in the side cross-sectional view of the inner pot 30b, the heat conduction member 34 may have an L-shape. For instance, the heat conduction member 34 may include (i) a first portion that extends along the outer surface of the inner pot and (ii) a second portion that is curved from a lower end of the first portion toward the inner surface of the inner pot 30b and that extends into the heat conduction space. In some examples, an outer surface of the first portion may be flush with an outer surface of the inner pot 30b.

The heat conduction member 34 may be bent by 90 degrees, as shown in FIG. 8B, or alternatively, may be bent to have a curved shape.

As described with reference to FIG. 8A, the heat conduction member 34 may have one end facing the bottom surface 31 may be spaced apart from the bottom surface 31 by a predetermined distance.

FIG. 9 shows temperatures of inner pots 30, 30a, and 30b with respect to heights of the inner pots 30, 30a and 30b determined based on a lower portion of the inner pot 30 in FIG. 4A and lower portions of the inner pot 30a and 30b in FIGS. 8A and 8B heated with same power.

Referring to FIG. 9, in the case of the inner pot 30 shown in FIG. 4A, the surface of the inner pot 30 has a temperature from a minimum of 224° C. to a maximum of 120° C., and in the case of the inner pot 30a shown in FIG. 8A, the surface of the inner pot 30a has a temperature from a minimum of 120° C. to a maximum of 206° C., and in the case of the inner pot 30b is shown in FIG. 8B, the surface of the inner pot 30 has a temperature of a minimum of 120° C. to a maximum of 200° C.

The inner pots 30a and 30b including the heat conduction member 34 may improve the temperature distribution uniformity compared to the inner pot not including the heat conduction member 34. The inner pot 30b including an L-shaped heat conduction member 34 has improved temperature distribution uniformity compared to the inner pot 30a including the I-shaped heat conduction member 34.

FIG. 10 shows a graph corresponding to a temperature (T) of the inner pot 30 in FIG. 4A, a temperature (Ta) of the inner pot 30a in FIG. 8A, and a temperature (Tb) of the inner pot 30b in FIG. 8B with respect to heights of inner pots 30, 30a, and 30b.

Referring to FIG. 10, when temperatures of the inner pots are measured at a relatively low height of the inner pots, the inner pots 30a and 30b including the heat conduction member 34 have lower temperatures than the inner pot 30 not including the heat conduction member 34 (see a direction of arrow A). By contrast, when temperatures of the inner pot are measured at a relatively greater height of the inner pots, the inner pots 30a and 30b including the heat conduction member 34 have greater temperatures than the inner pot 30 not including the heat conduction member 34 (see a direction of arrow B). Accordingly, the overall temperature distribution uniformity is provided.

In some cases, when the temperatures of the inner pots are measured at a relatively less height of the inner pots, the inner pot 30b including the L-shaped heat conduction member 34 has lower temperature of the inner pot 30b than the inner pot 30a including the I-shaped heat conduction member 34 (see a direction of arrow A). By contrast, when the temperatures of the inner pots measured at a relatively greater height of the inner pots, the inner pot 30b including the L-shaped heat conduction member 34 has greater temperature of the inner pot 30b than the inner pot 30a including the I-shaped heat conduction member 34 (see a direction of arrow B). Accordingly, the overall temperature distribution uniformity is provided.

As described above, according to the present disclosure, the heat conduction efficiency may be further improved through the heat conduction member 34, thereby further improving the cooking quality through a very simple configuration, thereby improving productivity of the product.

In some implementations, a metal plate configured to be heated based on the magnetic field generated by the heating coil H.C. may be disposed on the bottom surface 31 of the inner pot 30.

In order to improve the heat conduction efficiency, the inner pot 30 may be made of a material having little or no magnetic properties (e.g., aluminum (Al), copper (Cu), and the like) and having high thermal conductivity. In this case, little or no induced current, which is generated based on the magnetic field, may be generated on the bottom surface 31 of the inner pot 30.

In some implementations, even when the inner pot 30 has the greater thermal conductivity, as no heat is generated on the bottom surface 31 of the inner pot 30, the metal plate may be disposed on the bottom surface 31 of the inner pot 30 to generate the heat in the inner pot 30.

The metal plate is made of a magnetic material, and may be attached to the bottom surface 31 of the inner pot 30 and may be coated on the bottom surface 31 of the inner pot 30 through a metal spraying process.

Accordingly, based on the magnetic field generated by the heating coil H.C., heat may be generated in the metal plate based on the induced current, and the heat generated in the metal plate may be transferred to the inner pot 30.

In some cases, where the inner pot 30 is made of a material having the greater thermal conductivity and being not magnetic, the heat conduction member 34 having the greater thermal conductivity than the thermal conductivity of the material of the inner pot 30 may be provided in the heat conduction space HA of the inner pot 30.

Various substitutions, modifications, and changes may be made within the scope that does not deviate from the technical idea of the present disclosure for the skilled person in the art to which the present disclosure pertains, the above-mentioned disclosure is not limited to the above-mentioned implementation and the accompanying drawings.

Other implementations are within the scope of the following claims.

What is claimed is:

1. A wireless induction heating cooker comprising:
   a main body configured to receive and heat food objects therein;
   a lid configured to couple to an upper surface of the main body; and
   an inner pot configured to be accommodated in the main body and to be heated based on a magnetic field being generated by a heating coil of an induction heating device,
   wherein the inner pot defines a heat conduction space that is surrounded by a bottom surface, an outer surface, and an inner surface of the inner pot,
   wherein the inner pot has (i) a first part that extends downward to a preset depth and defines a first inner diameter that is constant and (ii) a second part that extends downward from the preset depth toward the bottom surface of the inner pot and defines a second inner diameter that decreases as a depth of the inner pot increases toward the bottom surface of the inner pot, and
   wherein an outer diameter of the inner pot is constant at the first and second parts of the inner pot.

2. The wireless induction heating cooker of claim 1, wherein the lid is coupled to the main body by a hinge and configured to open and close the upper surface of the main body, the lid being configured to be detached from the main body.

3. The wireless induction heating cooker of claim 1, wherein the inner pot is configured to transfer heat generated on the bottom surface of the inner pot in a direction upward through the heat conduction space.

4. The wireless induction heating cooker of claim 1, wherein the inner pot has a cylindrical shape and defines a pot opening at an upper surface thereof, and
   wherein the bottom surface of the inner pot has a flat shape and is configured to contact a bottom surface of the main body.

5. The wireless induction heating cooker of claim 1, wherein an area of the bottom surface of the inner pot is less than an area defined by the heating coil of the induction heating device.

6. The wireless induction heating cooker of claim 1, wherein the inner pot comprises a rounding portion that is disposed on the inner surface of the inner pot and that extends from an outer edge of the bottom surface of the inner pot.

7. The wireless induction heating cooker of claim 1, wherein the inner pot extends along a vertical center line, and
   wherein a horizontal distance between the vertical center line and the outer surface of the inner pot is constant.

8. The wireless induction heating cooker of claim 1, wherein a horizontal distance between the outer surface of the inner pot and the inner surface of the inner pot increases as the depth of the inner pot increases toward the bottom surface of the inner pot.

9. The wireless induction heating cooker of claim 8, wherein the horizontal distance between the inner surface and the outer surface of the inner pot is greater than a vertical thickness of the bottom surface of the inner pot.

10. The wireless induction heating cooker of claim 1, further comprising:
    a heat conduction member disposed in the heat conduction space,
    herein a thermal conductivity of the heat conduction member is greater than a thermal conductivity of the inner pot.

11. The wireless induction heating cooker of claim 10, wherein the inner pot is made of cast iron or stainless steel, and the heat conduction member is made of copper or aluminum.

12. The wireless induction heating cooker of claim 10, wherein the heat conduction member extends along a depth direction of the inner pot.

13. The wireless induction heating cooker of claim 12, wherein the heat conduction member has one end that is horizontally bent and extends into the heat conduction space.

14. The wireless induction heating cooker of claim 10, wherein the heat conduction member extends vertically along the outer surface of the inner pot.

15. The wireless induction heating cooker of claim 10, wherein the heat conduction member comprises:
   a first portion that extends along the outer surface of the inner pot; and
   a second portion that is curved from a lower end of the first portion toward the inner surface of the inner pot and that extends into the heat conduction space.

16. The wireless induction heating cooker of claim 10, wherein the heat conduction member is disposed vertically above the bottom surface of the inner pot.

17. The wireless induction heating cooker of claim 10, wherein an outer surface of the heat conduction member is flush with the outer surface of the inner pot.

18. The wireless induction heating cooker of claim 10, wherein the heat conduction member has a ring shape that extends along a circumferential direction of the inner pot.

19. The wireless induction heating cooker of claim 18, wherein the heat conduction member surrounds a lower portion of the outer surface of the inner pot.

20. The wireless induction heating cooker of claim 1, wherein the bottom surface of the inner pot is defined by a metal material and configured to be heated based on the magnetic field being generated by the heating coil.

* * * * *